3,225,090
BIS(AMINODIARYLPHOSPHINE) DECABORANES
Joseph R. Reiner, Northford, and Hansjuergen A. Schroeder, New Haven, Conn., assignors to Olin Mathieson Chemical Corporation, a corporation of Virginia
No Drawing. Filed May 17, 1963, Ser. No. 281,325
5 Claims. (Cl. 260—551)

This invention relates to novel nitrogen-containing bis(phosphine) decaboranes and to a method for their preparation.

The novel nitrogen-containing bis(phosphine) decaboranes of this invention have the general formula:

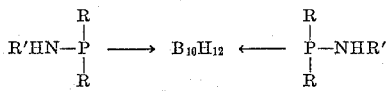

wherein R is an aryl radical selected from the group consisting of phenyl, tolyl, xylyl, naphthyl, biphenylyl or alkyl derivatives of these same aryl radicals and R' is hydrogen, amino, alkylamino in which the alkyl substituent has from 1 to 4 carbon atoms or alkyl having from 1 to 4 carbon atoms.

It has been found that the novel nitrogen-containing bis(phosphine) decaboranes can be prepared by reacting a bis(halodiarylphosphine) decaborane of the formula:

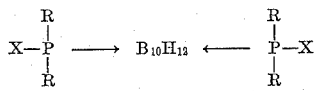

wherein X is a halogen and R is an aryl radical selected from the group consisting of phenyl, tolyl, xylyl, naphthyl, biphenylyl or alkyl derivatives of these same radicals, with a compound of the formula:

$$NH_2R'$$

wherein R' is selected from the group consisting of hydrogen, alkyl of from 1 to 4 carbon atoms, $NH_2$ or $NHR''$, wherein $R''$ is alkyl of from 1 to 4 carbon atoms. The novel process of this invention is carried out in the presence of an inert organic liquid, preferably a monohydric alcohol.

The reaction proceeds according to the following equation:

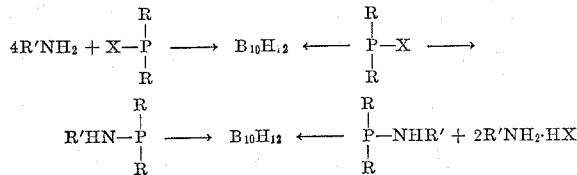

wherein R, R' and X have the same meaning as previously described. Although the reaction proceeds satisfactory at room temperature, if desired, temperatures as low as about −10° C. up to about +60° C. can be employed. Preferably the reaction temperature is maintained between about +10° C. and about +50° C. In the process of this invention the reaction time will vary widely from about 0.10 hour to about 10 hours or more and preferably will be from about 0.15 hour to about 3 hours depending upon the particular reaction conditions employed. Generally the reaction is carried out at atmospheric pressure, however, pressures varying from sub-atmospheric to about +5 atmospheres can be employed. Stoichiometric quantities of the reactants are usually employed although, if desired, an excess of the nitrogen-containing reactant in an amount of from about 1.5 to about 3.0 times the stoichiometric requirement can be utilized.

If the nitrogen base compound employed is a gas at room temperature (e.g. ammonia or monomethylamine), it is simply passed into a dispersion of the bis(halodiarylphosphine) decaborane in the respective organic medium. If it is a liquid (hydrazine, etc.), it is added directly or dissolved in the respective organic medium to the dispersion. The desired reaction product is separated from the reaction mixture by any of a number of methods well known in the art such as by filtration (if insoluble) or evaporation (if soluble) of the solvent. The crude product can be purified by recrystallization from a wide variety of solvents such as benzene, xylene, toluene, chloroform, ethanol, propanol, isobutanol, etc.

Useful inert organic liquids include the monohydric alcohols of the formula:

$$R'''OH$$

wherein $R'''$ is alkyl having from 1 to 10 carbon atoms. Suitable liquids include ethyl alcohol, n-butyl alcohol, isopropyl alcohol, n-amyl alcohol, isoamyl alcohol, n-hexyl alcohol, n-octyl alcohol, etc.

The bis(halodiarylphosphine) decaboranes utilized as starting materials in the process of this invention can be prepared by the method set forth in Heying and Schroeder application Serial No. 205,859, filed June 28, 1962 for Product and Method. For example, when diphenylchlorophosphine is reacted with decaborane in the presence of diethyl ether for a period of about 20 hours at about 25° C. the resulting product is bis(chlorodiphenylphosphine) decaborane. Bis(halodiarylphosphine) decaboranes useful as starting materials in the process of this invention include bis(chlorodiphenylphosphine) decaborane, bis(chlorodinaphthylphosphine) decaborane, bis(chloroditolylphosphine) decaborane, bis(chlorodixylylphosphine) decaborane, bis(chlorodibiphenylylphosphine) decaborane, and the corresponding bromine, iodine, and fluorine derivatives. In addition, alkyl substituted materials of the type mentioned can be employed in this invention as starting materials, for example, bis(chlorodiisopropylphenylphosphine) decaborane, bis(chloroethylphenylphosphine) decaborane, bis(chlorodi-n-butyltolylphosphine) decaborane, bis(chlorodiisoamylxylylphosphine) decaborane, etc., and the corresponding bromine, iodine, and fluorine derivatives.

The solid products of this invention are colorless crystalline materials useful for the stabilization of polyvinylchloride polymers against ultraviolet and thermal decomposition. Samples of polyvinylchloride resins to which the colorless compounds of this invention had been added, were subjected to ultraviolet radiation tests of 700 hours duration and at the end of that time the samples remained unchanged in color whereas when unstabilized samples were subjected to the same tests they began to decompose after about 200 hours of exposure and after 700 hours they were recovered discolored and sticky. Samples of polyvinyl chloride containing commercial inhibitors which were slightly yellow on preparation turned to a deep yellow color during the same 700 hour test.

EXAMPLE I

Gaseous ammonia was passed into a suspension of bis(chlorodiphenylphosphine) decaborane (5.61 g., 0.01 mole) in anhydrous ethanol (200 ml.). The temperature was maintained at 20° C. by cooling and complete solution occurred after 15 minutes. Excess ammonia then was evaporated and 5.2 g. of crude bis(aminodiphenylphosphine) decaborane (A) precipitated and was recovered by filtration. Recrystallization from benzene gave 4.96 g. (95 percent of the theoretical quantity) of pure material, M.P. 222° C.

Calc'd for $C_{24}H_{36}B_{10}N_2P$: C, 55.14; H, 6.94; B, 20.70;

N, 5.36; P, 11.85. Found: C, 55.11; H, 7.00; B, 20.84; N, 5.23; P, 11.80.

(A)
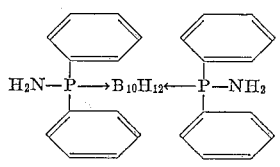

EXAMPLES II–VI

A number of experiments was performed in other alcohols in the same manner as described in Example I. In all of these examples gaseous ammonia was passed into a suspension of bis(chlorodiphenylphosphine) decaborane in the alcohol. Pertinent data relating to these experiments are compiled in Table 1.

*Table 1*

| Example | Bis(chloro-diphenyl-phosphine) decaborane (grams) | Alcohol (amount in ml.) | Yield of bis(amino-diphenylphosphine) decaborane | |
|---|---|---|---|---|
| | | | Grams | Percent |
| II | 2.8 | Methanol (100) | 1.57 | 60 |
| III | 2.8 | Isopropanol (100) | 2.50 | 96 |
| IV | 2.8 | t-butanol (100) | 2.48 | 95 |
| V | 5.6 | n-butanol (150) | 5.15 | 98 |
| VI | 11.3 | n-butanol (250) | 10.45 | 100 |

EXAMPLE VII

Gaseous methylamine was bubbled through a suspension of bis(chlorodiphenylphosphine) decaborane (4 g.) in ethanol (150 ml.) for 30 minutes while the temperature was maintained at 25° C. Upon evaporation of excess methylamine, bis(methylaminodiphenylphosphine) decaborane (B) separated, was filtered and recrystallized from benzene. Yield of product: 3.53 g. (90 percent of the theoretical amount); M.P. 226° C.

Calc'd for $C_{26}H_{40}B_{10}N_2P_2$: C, 56.70; H, 7.32; B, 19.65; N, 5.08; P, 11.25. Found: C, 56.82; H, 7.30; B, 19.71; N, 5.09; P, 11.00.

(B)
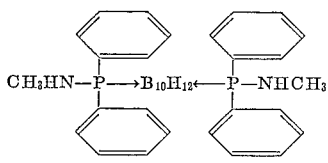

EXAMPLE VIII

A solution of n-butylamine (1.46 g., 0.02 mole) in ethanol (20 ml.) was added dropwise to a suspension of bis(chlorodiphenylphosphine) decaborane (2.8 g., 0.005 mole) in ethanol (80 ml.) at 15° C. After stirring for one hour, the reaction mixture was filtered and the crude bis(butylaminodiphenylphosphine) decaborane (C) recrystallized from ethanol. Yield fo product: 2.85 g. (92 percent of the theoretical amount); M.P. 165° C.

Calc'd for $C_{32}H_{52}B_{10}N_2P_2$: C, 60.53; H, 8.26; B, 17.04; N, 4.41; P, 9.76. Found: C, 60.43; H, 8.51; B, 16.66; N, 4.21; P, 9.50.

(C)
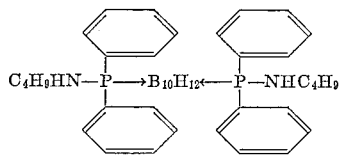

EXAMPLE IX

To a suspension of bis(chlorodiphenylphosphine) decaborane (5.61 g., 0.01 mole) in ethanol (180 ml.) there was added, with stirring, a solution of hydrazine (1.3 g., 0.04 mole) in ethanol (20 ml.). The mixture was kept at 30° for 1 hour, then filtered, and the bis(hydrazino-diphenylphosphine) decarborane, (D) was recrystallized from chloroform; yield of product: 5.25 g. (95 percent of the theoretical amount); M.P. 214–15° C.

Calc'd for $C_{24}H_{38}B_{10}N_4P_2$: C, 52.15; H, 6.93; B, 19.58; N, 10.14; P, 11.21. Found: C, 51.20; H, 7.32; B, 19.67; N, 10.44; P, 10.90.

(D)
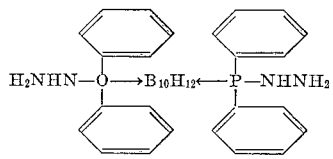

ULTRAVIOLET AND THERMAL DECOMPOSITION TESTS OF POLYVINYL CHLORIDE RESINS

Three test samples were prepared as follows:

(A) (Unstabilized polyvinyl chloride): 100 parts of a plastisol-type low molecular weight polyvinyl chloride resin having an inherent viscosity of 1.27 and 100 parts of dioctylphthalate (DOP) were mixed and evacuated to remove entrapped air.

(B) (Polyvinyl chloride stabilized with

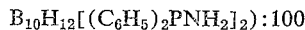

parts of the same polyvinyl chloride resin as employed in the preparation of (A) 100 parts (DOP) and 1 part $B_{10}H_{12}[(C_6H_5)_2PNH_2]_2$ decaborane were mixed and evacuated.

(C) (Polyvinyl chloride stabilized with

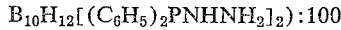

parts of the same polyvinyl chloride resin utilized in the preparation of sample (A) 100 parts (DOP) and 1 part

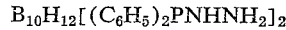

decaborane were mixed and evacuated.

THERMAL STABILITY TEST

Samples A, B, and C were placed on six metal strips and placed in an oven maintained at 150 °C., each strip containing all three samples. At 20 minute intervals one strip was removed from the oven, the three samples removed and stapled to a card. Comparison of the three samples taken from the six strips showed the following results:

*Sample A.*—Decomposition began after approximately 10 minutes. The sample removed at the end of the first 20 minute period had turned brown. Decomposition continued and at the end of the two hour test the material was sticky and dark brown in color.

*Samples B and C.*—The initially colorless samples had developed a light yellow shade at the end of the two hour test period.

ULTRAVIOLET STABILITY TEST

Samples A, B, and C were placed in an oven at 150° C. for 10 minutes to form a film. These films were placed on wooden panels and mounted in a device ("Weatherometer") in which they were subjected to accelerated weathering, similar to that received outdoors. After exposure to ultraviolet radiation for 700 hours (equivalent to over 4 years outdoor exposure), the samples were examined and the following observations made:

*Sample A.*—Decomposition started after 200 hours of exposure and continued steadily producing, after 700 hours, a sticky, discolored material.

*Samples B and C.*—The colorless samples had turned to a light yellow at the end of the 700 hour test.

What is claimed is:

1. A bis(phosphine) decaborane of the formula:

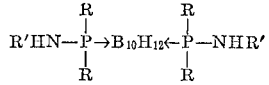

wherein R is an aryl radical selected from the group consisting of phenyl, tolyl, xylyl, naphthyl, or biphenylyl and R' is a member selected from the group consisting of hydrogen, alkyl of 1 to 4 carbon atoms, and $NH_2$.

2. Bis(aminodiphenylphosphine) decaborane.
3. Bis(methylaminodiphenylphosphine) decaborane.
4. Bis(butylaminodiphenylphosphine) decaborane.
5. Bis(hydrazinodiphenylphosphine) decaborane.

References Cited by the Examiner

UNITED STATES PATENTS

| | | | |
|---|---|---|---|
| 2,146,584 | 2/1939 | Lipkin | 260—551 X |
| 2,776,311 | 1/1957 | Erbel et al. | 260—551 |
| 3,013,041 | 12/1961 | Aftandilian | 260—606.5 X |
| 3,100,774 | 8/1963 | Reetz | 260—606.5 X |

OTHER REFERENCES

Burg et al.: J.A.C.S., vol. 80, pp. 1107–9 (1958).
Harris, Proceed. Chem. Soc. (London), vol. 1957, pp. 118–119.
Isslieb et al.: Ber. Deut. Chem., vol. 92, pp. 2681–2964 (1959).
Michaelis, Ann. Der Chem., vol. 315, pp. 54–62 (1901).
Smith et al.: J. Org. Chem., vol. 26, 5140–5147 (1961).

CHARLES B. PARKER, *Primary Examiner.*